United States Patent
Ramegowda et al.

(10) Patent No.: US 9,621,823 B2
(45) Date of Patent: Apr. 11, 2017

(54) THERMAL CAMERA CALIBRATION

(75) Inventors: Dinesh Ramegowda, Mysore (IN); Mohammed Ibrahim Mohideen, Bangalore (IN); Lokesh Rayasandra Boregowda, Bangalore (IN); Bin Sai, Zuid Holland (NL); Vijendran Gopalan Venkoparao, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 1753 days.

(21) Appl. No.: 12/883,568

(22) Filed: Sep. 16, 2010

(65) Prior Publication Data

US 2012/0069193 A1    Mar. 22, 2012

(51) Int. Cl.
*H04N 5/33* (2006.01)
*H04N 17/00* (2006.01)

(52) U.S. Cl.
CPC ............ *H04N 5/33* (2013.01); *H04N 17/002* (2013.01)

(58) Field of Classification Search
USPC ........................................ 348/164
See application file for complete search history.

(56) References Cited

U.S. PATENT DOCUMENTS

| | | | |
|---|---|---|---|
| 5,602,389 A * | 2/1997 | Kato ................ | G01J 5/522 250/252.1 |
| 6,768,509 B1 * | 7/2004 | Bradski et al. ......... | 348/207.99 |
| 6,917,702 B2 * | 7/2005 | Beardsley ............... | 382/154 |
| 7,084,386 B2 * | 8/2006 | Bernardini et al. ......... | 250/216 |
| 7,834,905 B2 * | 11/2010 | Hahn et al. .................. | 348/148 |
| 7,924,312 B2 * | 4/2011 | Packard ...................... | 348/164 |
| 8,049,163 B1 * | 11/2011 | Granneman ............ | G01J 5/522 250/252.1 |
| 8,378,290 B1 * | 2/2013 | Speake ................... | H04N 5/33 250/252.1 |
| 2007/0291185 A1 * | 12/2007 | Gelb et al. ................... | 348/745 |
| 2008/0097156 A1 * | 4/2008 | Nakamura ................... | 600/117 |
| 2008/0228434 A1 * | 9/2008 | Aratani et al. .............. | 702/150 |

(Continued)

OTHER PUBLICATIONS

Dr. David A. Imrie, "Calibrating the Thermal Camera"; Dec. 2009, Photonics Spectra Laurin Publishing.*

(Continued)

*Primary Examiner* — Joshua Joo
(74) *Attorney, Agent, or Firm* — Seager, Tufte & Wickhem, LLP

(57) ABSTRACT

A system for calibrating a thermal camera with a calibration target. The calibration target may have a pattern which can be seen on an infrared image captured by the camera. The pattern may be of various kinds. For example, the pattern may be a checkerboard with some, such as every other square, having one emissitivity and the remaining squares having a different emissitivity, or having infrared light sources placed at corners of the squares. A difference between the emmissitivities may be sufficient so that the checkerboard pattern appears in an infrared image captured by the camera for calibration. The calibration may aid in determining intrinsic and extrinsic parameters of the camera. The parameters may provide a basis for transforming camera pixel coordinates to a world coordinate system which allows measurement of real world entities by the thermal camera. Measurements may incorporate distances between objects, heights of objects, and so forth.

14 Claims, 9 Drawing Sheets

(56) References Cited

U.S. PATENT DOCUMENTS

2010/0179781 A1\* 7/2010 Raphael ........................ 702/94
2010/0284591 A1\* 11/2010 Arnon et al. ................ 382/128
2011/0128386 A1\* 6/2011 Letessier et al. ............ 348/164

OTHER PUBLICATIONS

Cheng et al. ("Multiperspective Thermal IR and Video Arrays for 3D Body Tracking and Driver Activity Analysis"); 2nd Joint IEEE International Workshop on Object Tracking and Classification in and Beyond the Visible Spectrum (OTCBVS'05) in conjunction with IEEE CVPR2005, San Diego CA, USA. Jun. 2005.\*

Cheng et al., "Multiperspective Thermal IR and Video Arrays for 3D Body Tracking and Driver Activity Analysis," 2nd Joint IEEE International Workshop on Object Tracking and Classification in and Beyond the Visible Spectrum, 8 pages, 2005.

\* cited by examiner

THERMAL CAMERA CALIBRATION

BACKGROUND

The disclosure herein pertains cameras and particularly to thermal cameras. More particularly, the disclosure pertains to calibration of thermal cameras

SUMMARY

The disclosure pertains to a system for calibrating a thermal camera with a calibration target. The calibration target may have a pattern which can be seen on an infrared image captured by the camera. The pattern may be of various kinds. For example, the pattern may be a checkerboard with every other square having one emissitivity and the remaining squares having a different emissitivity, or having infrared light sources placed at corners of the squares. A difference between the emmissitivities may be sufficient so that the checkerboard pattern appears in an infrared image captured by the camera for calibration. The calibration may aid in determining intrinsic and extrinsic parameters of the camera. The parameters may provide a basis for transforming camera pixel coordinates to a world coordinate system which allows measurement of real world entities by the thermal camera. Measurements may incorporate distances between objects, heights of objects, and so forth.

DESCRIPTION

In order to help confirm that a measurement device is operating satisfactorily, it appears significant that the device such as a camera should be calibrated. Calibration may be a procedure that establishes, under specified conditions, a relationship between the values of quantities indicated by a measuring instrument and the corresponding values realized by the standards. In geometrical camera calibration, one objective is to determine a set of camera parameters that describe a mapping of 3-D reference coordinates and 2-D image coordinates. The present approach may provide for calibrating a thermal camera with the help of a specially constructed calibration pattern of which an infrared image may be captured by the thermal camera. The terms "infrared" and "thermal" may be used interchangeably. However, in general, "infrared" may be associated with an image and "thermal" may be associated with a camera. Using a broad sense of the terms, thermal or infrared may pertain to radiation having a wavelength somewhere from 0.7 micron to 1000 microns.

Due to advancements in infrared technology, thermal cameras appear to be coming more affordable. Thus, thermal cameras may be widely used in sophisticated computer vision applications. There are several applications where thermal cameras may be employed. Examples may incorporate petrochemical refineries, automation, safety, security, surveillance, and so on. Many of the computer vision type applications may be based on thermal cameras requiring accurate and reliable measurements of real world entities such as distances between objects and a camera, heights of objects, and so forth. Real world entities may be measured by translating pixel coordinates of a camera to world coordinates. A transformation from pixel coordinates to a world coordinate system may essentially require a camera's intrinsic and extrinsic parameters. These parameters for a thermal camera may be obtained by a process of calibration.

A checkerboard pattern may be used to calibrate electro-optical (EO) cameras. However, for a thermal camera, calibration with such a pattern affixed on any surface may fail. This failure may be attributed to a fact that a black and white pattern, or a pattern of other colors, such as that of a checkerboard, does not necessarily exhibit a temperature differences indicating an intensity difference on which a captured image does not appear sufficient for a thermal camera to detect. To overcome such an insufficiency, an approach for constructing the calibration pattern may use materials of different thermal emissivities applied to the calibration chart. Intensity differences appearing in a captured image of the chart may be processed according to standard calibration procedures.

Figure 1:
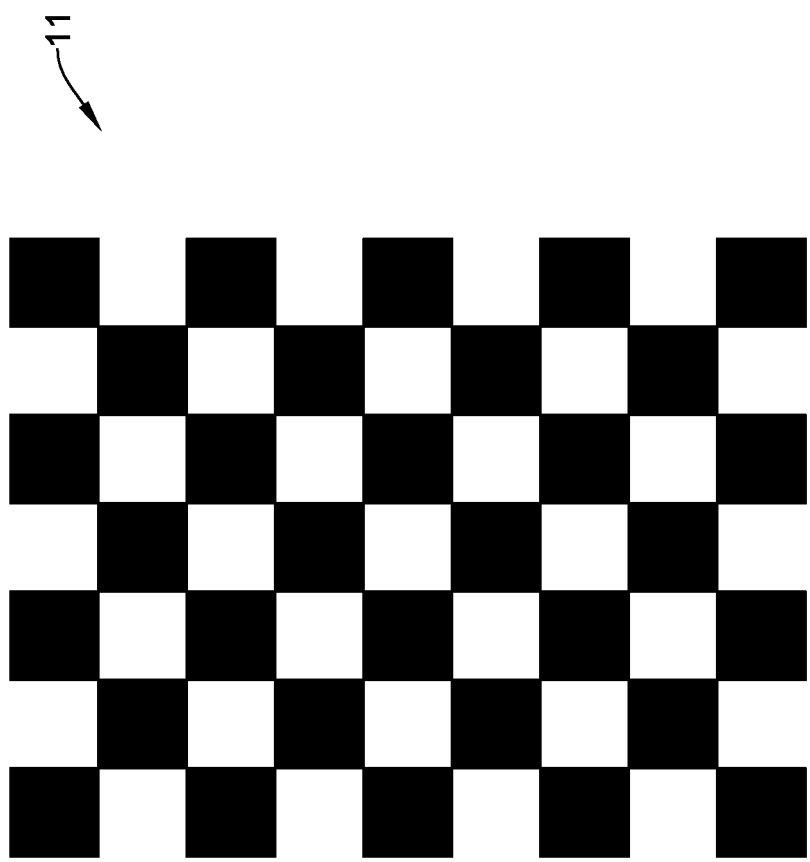
FIG. 1 is a diagram of a checkerboard pattern captured by an electro-optical camera.
Figure 2:
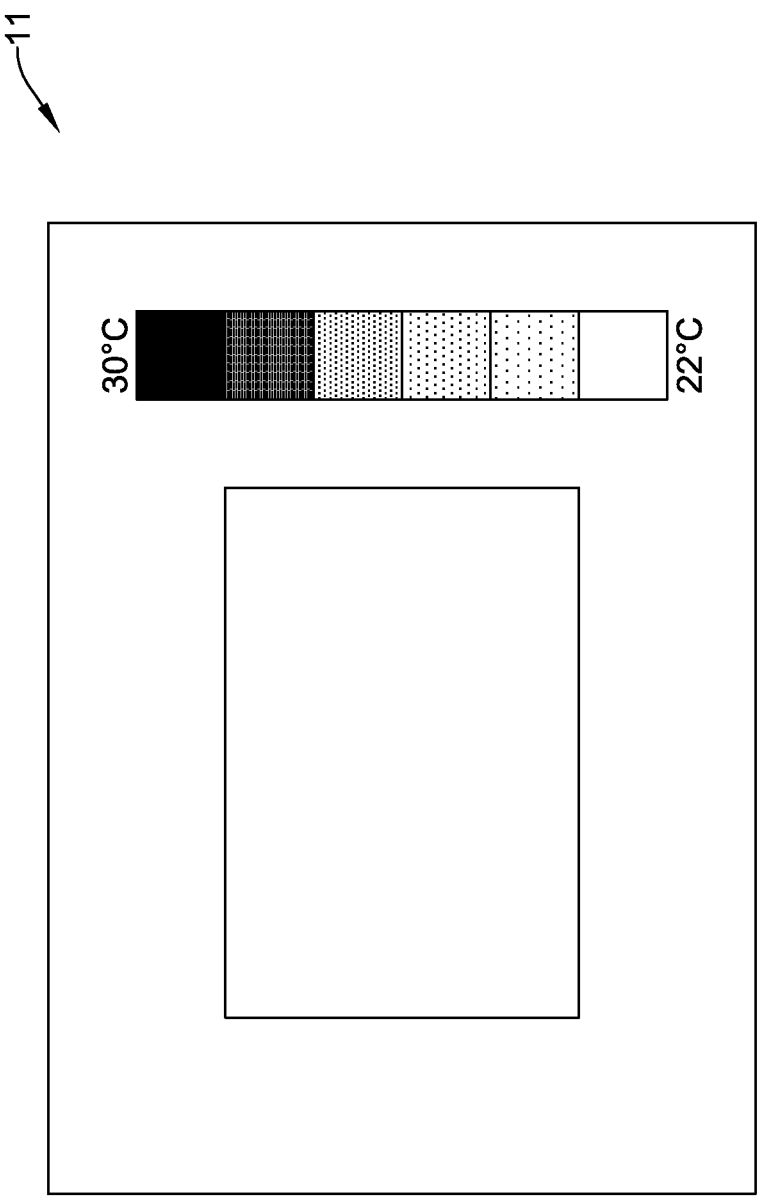
FIG. 2 is a diagram of the checkerboard pattern in FIG. 1 captured by a thermal camera.
Figure 3:
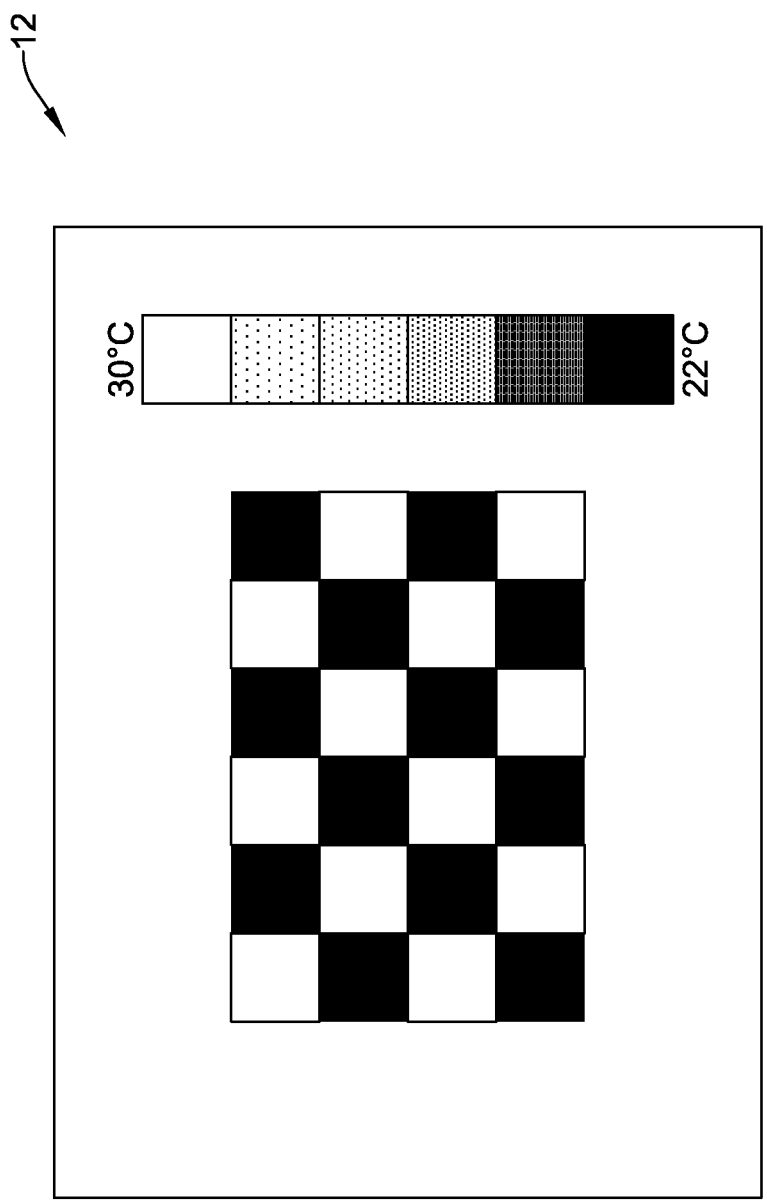
FIG. 3 is a diagram of an image captured by a thermal camera with a presently constructed checkerboard pattern.

FIG. 1 shows a checkerboard pattern 11 captured by an electro-optical camera. FIG. 2 shows the same checkerboard pattern 11 captured by a thermal camera. It appears evident according to FIG. 2 that the regular checkerboard pattern can not be used to calibrate the thermal cameras. FIG. 3 shows an image captured by a thermal camera with the presently constructed checkerboard pattern 12. Thus, in view of FIG. 3, the presently constructed calibration pattern 12 appears sufficient and appropriate for calibrating thermal cameras. Pattern 12 may instead incorporate other shapes such as triangles, circles, and so on, or a mixture of various shapes or sizes of shapes, and having two or more emissitivities.

Figure 4:
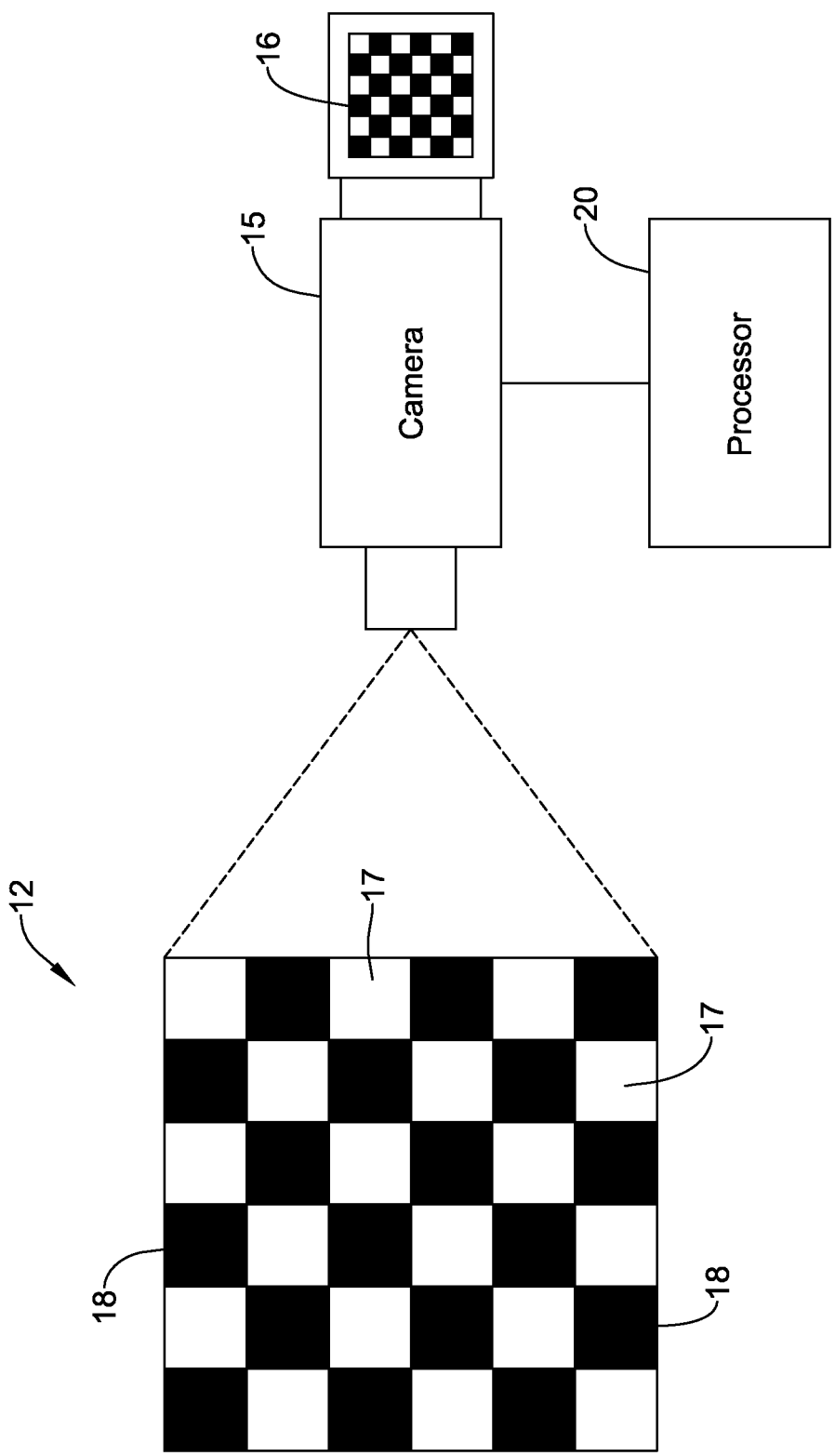
FIG. 4 is a diagram of a thermal camera capturing an infrared image of a present calibration target.

FIG. 4 is a diagram of a thermal camera 15 capturing an infrared image 16 of a calibration target 12. Light geometrical symbols 17 may have a first emissitivity value and darker geometrical symbols 18 may have a second emissitivity value. The first and second emissitivity values should be at least 20 percent different from each other for effortless viewing and use of calibration target 12 in infrared image 16. One may note that satisfactory emissitivity value differences may instead be 30, 40, 50, 60, 70, 80, 90 or virtually 100 percent. The emissitivity values could be less than 20 percent different and yet be useful. Image 16 may be sent to processor 20 for analysis, comparison with a reference image, determination of intrinsic and extrinsic parameters of camera 15, conversion of camera 15 pixel coordinates to world coordinates, and so on. A Matlab™ camera calibration toolbox for may be used to calibrate the thermal camera relative to, for example, intrinsic and extrinsic parameters.

Figure 5:
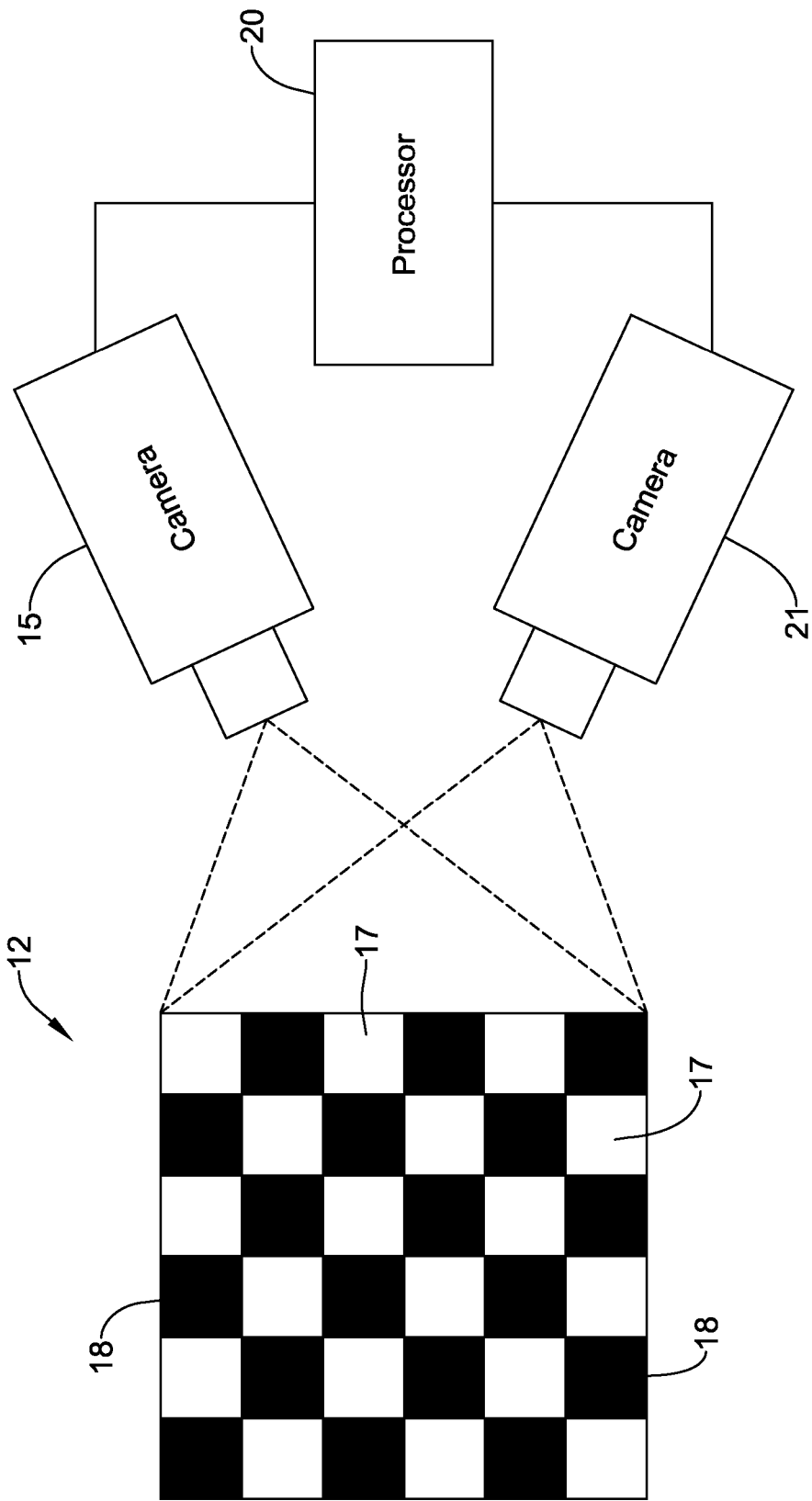
FIG. 5 is a diagram of a thermal camera and another camera capturing images of the present calibration target.

FIG. 5 is a diagram of thermal camera 15 and another camera 21 capturing images of calibration target 12. Camera 21 may be another thermal camera or an electro-optical camera. In a situation where camera 21 is a thermal camera, infrared images of target 12 from cameras 15 and 21 may go to processor 20 for comparison or analysis. Camera 15 may be calibrated to camera 21 or vice versa. Other processes may be effected by processor 20 on these images as indicated herein.

On the other hand, in a situation where camera 21 is an electro-optical camera, an infrared image of target 12 from camera 15 and a visible wavelength image of target 12 from camera 21 may go to processor 20 for comparison from a geometrical or other perspective, as long as target 12 has attributes visible to the electro-optical camera. Other processes may be effected on the images from cameras 15 and 21 as indicated herein.

Figure 6:
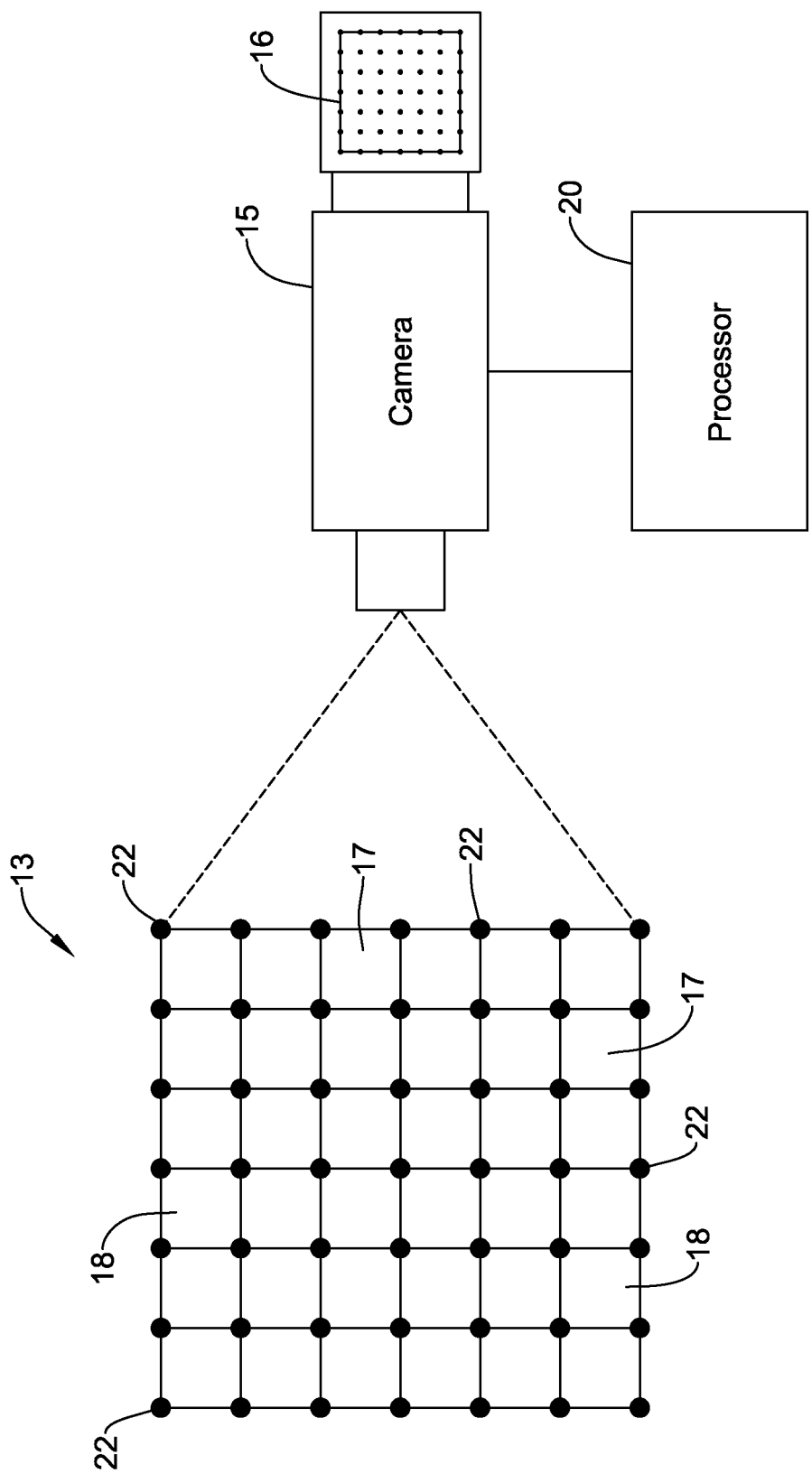
FIG. 6 is a diagram of a calibration target having infrared light sources on the corners of symbols on the target.

FIG. 6 is a diagram of a calibration target 13 having infrared light sources 22 on the corners of symbols 17 and 18. Symbols 17 and 18 with two or more different emissitivity values are not necessarily needed for target 13 for purposes of obtaining an infrared image 16 of target 13. Image 16 revealing light sources 22 may be sent to processor 20 for calibration of thermal camera 15, or any other processes indicated herein. The symbols of targets 12 and 13 may be other shapes other than square-appearing shapes. Also, the shapes need not be uniform in size, shape or placement on calibration targets 12 and 13. Sources 22 may be of various wavelengths, even non-infrared wavelengths, since the latter may emit heat of one kind or another to provide a temperature difference or variation.

Emissivity may be the measure of an object's ability to emit infrared energy. Emitted energy may indicate the temperature of the object. Emissivity can have a value from 0 (shiny mirror) to 1.0 (blackbody). The emissivity of a material is the relative ability of its surface to emit energy by radiation. It is the ratio of energy radiated by a particular material to energy radiated by a black body at the same temperature. It is a measure of a material's ability to radiate absorbed energy. A true black body would have an emissitivity equal to one while any real object would have an emissitivity less than one. Emissivity is a dimensionless quantity, so it does not have units. In general, the duller and blacker a material is, the closer its emissivity is to 1. The more reflective a material is, the lower its emissivity. In other words, reflectivity is inversely related to emissivity and when added together their total should equal 1. Therefore, if asphalt has an emissivity value of 0.90, its reflectance value would be 0.10. This means that it absorbs and emits 90 percent of radiant energy and reflects only 10 percent. For examples of other emissivity values, highly polished silver may have an emissivity of about 0.02, aluminum foil of 0.03-0.05, paper of about 0.92, and glass (unglazed) of about 0.95.

It may be noted that the emissivity of a material does in general depend on its thickness. Thus, the emissivities quoted for materials herein would theoretically be for samples of infinite thickness (which, in practice, means samples that are optically thick). A thin sample of a material may have an emissivity lower than that of a thicker sample of the same material.

The present checkerboard calibration pattern may be used to calibrate both an electro-optical camera and a thermal camera. The calibration pattern may help in a precise localization of corner points, which can be very crucial for any calibration procedure. Therefore, one may expect to determine accurately calibration parameters with a chart having a calibration pattern and structure.

Variants of approaches for calibrating thermal cameras may utilize sustained and/or sharp-temperature difference related parameters, relative to a geometrical (spatial) calibration or other kinds of calibration of the thermal cameras. Flash heating an ordinary checkered chart for a short-lived infrared image is not necessarily an adequate approach for obtaining a chart having a sustained clear pattern for convenient thermal camera image capture and calibration. Leaving such an ordinary chart, for instance, in the sun, may not necessarily provide a sustained and/or sharply distinguishable pattern, if any, for thermal camera image capture and calibration.

In general, a checkerboard pattern seems to be a natural choice since straight lines with easily localized endpoints and interior points can be found in several orientations (horizontal, vertical, and various diagonals) throughout an image plane. The checkerboard pattern may also have the desirable property in that its corners are localizable independent of the linearity of the image response. That is, applying a nonlinear monotonic function to the intensity values of the checkerboard image, such as gamma correction, does not necessarily affect corner localization. Typically, for calibrating electro-optical cameras, the checkerboard pattern may be printed on paper or other material. The pattern may be posed for the camera at various distances and in different orientations. Subsequently, the captured images may be subjected to the calibration procedure by detecting the corner points. Although other types or designs of patterns may be utilized.

However, the same approach does not necessarily work for calibrating the thermal cameras since a calibration pattern printed on the paper appears to exhibit very little temperature difference between the white and black or other colored squares or other shapes of the pattern. Due to uniform temperature distribution across the paper, it may indeed be impossible to locate the corner points accurately for the images captured by the thermal camera. To overcome this limitation, one may replace the conventional calibration pattern with a special calibration pattern which is constructed with two or more different materials, for instance, silver foil and paper, which may exhibit different temperatures. This kind of calibration pattern may help in detecting the corner points more accurately because of a resulting significant exhibited temperature differences among the various materials. Even special and sufficiently thick material or materials with distinguishable emissitivities may be applied like paint on a chart for calibrating thermal and other kinds of cameras.

In the present approach, there may be alternative ways for constructing calibration patterns. One way for constructing calibration patterns may incorporate applying every other square with materials having different emissivity values. That is, one square has a first emissive value, the next square has a second emissive value, in that any square having a first emissitivity value may be adjacent to squares, if any, having a second emissitivity value, and vice versa. On the other hand, the squares of the pattern may have more than two values of emissitivity among them. The value of emissivity of each square on the chart may be measured or known beforehand for calibration purposes. This type of chart may be used for calibrating one thermal camera with respect to another thermal camera. Other geometric shapes may be implemented in a chart. A gradation of emissitivities in a shape or pattern may be implemented.

Another way of constructing calibration patterns may incorporate placing infrared light emitting diodes or other sources at each corner point of the squares or notable location points of other shapes. Such types of calibration patterns may facilitate in obtaining a highly accurate localization of corners or other points. The intensity and wavelengths of these diodes or sources may be determined or known beforehand for thermal camera calibration purposes.

Other sources having different wavelengths (e.g., non-infrared) and temperatures may be used for calibration purposes.

Figure 7A:
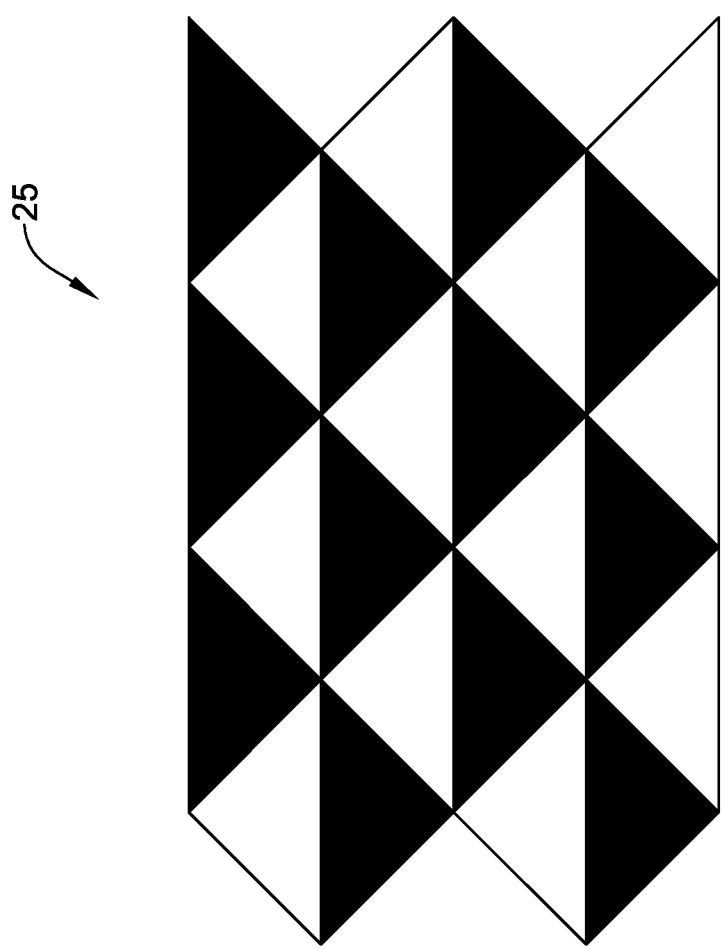
FIGS. 7a, 7b and 7c are diagrams of various patterns which may be used for a calibration chart.
Figure 7B:
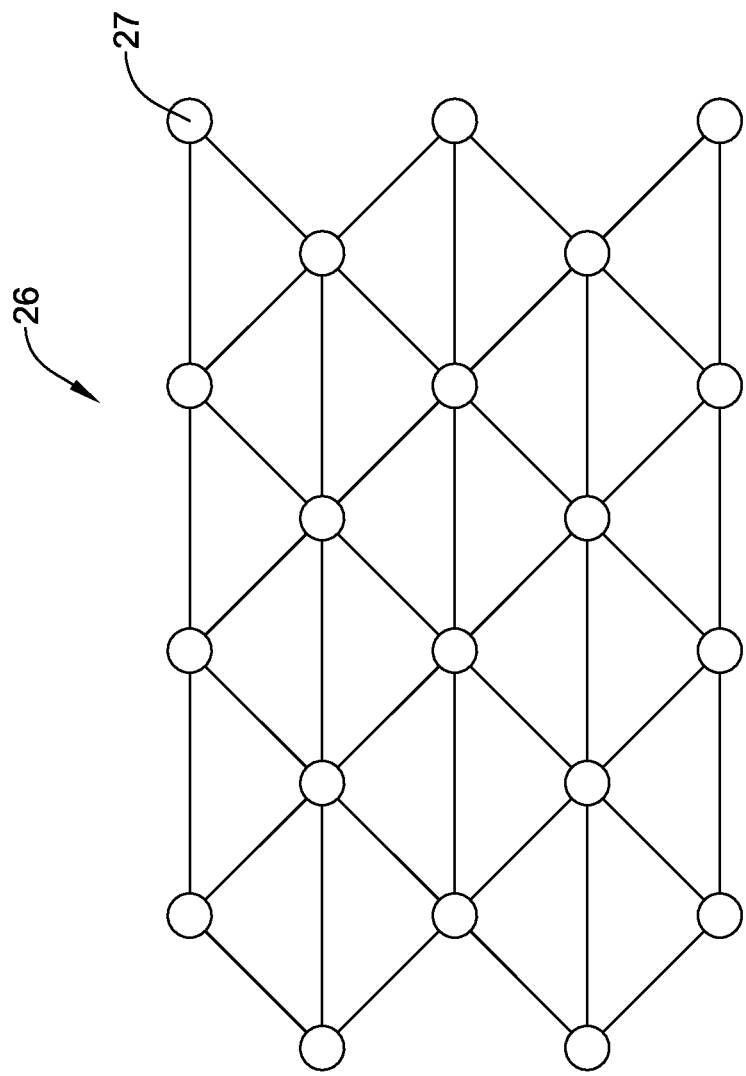

Various example geometric shapes and patterns may be used in various combinations or individually for a calibration chart. FIG. 7a is a diagram of a pattern 25 of triangles having alternating different emissitivities. The triangles in pattern 25 may be substituted with other geometrical shapes. Pattern 26 of the diagram in FIG. 7b represents a triangle pattern without the alternating different emissitivities but with heat sources or lights 27, detectable by a thermal camera, at corner points of the adjoining triangles. Similarly, as with pattern 25, pattern 26 may use other geometrical shapes. Heat or light sources 27 may be used in various ways, shapes or patterns for camera calibration.

Figure 7C:
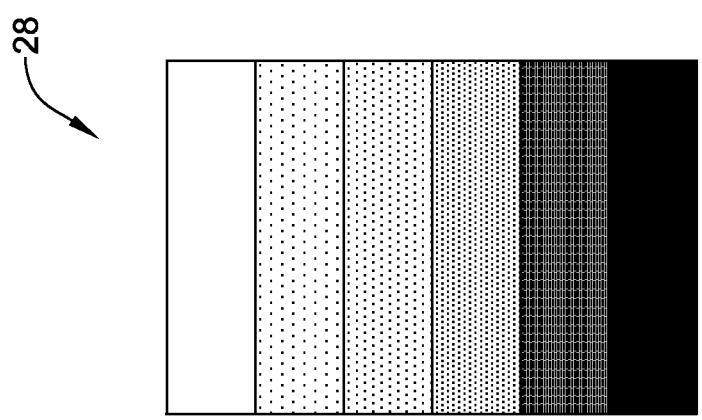

FIG. 7c is a diagram of a pattern 28 having rectangles adjacent to one another, for instance, which may consist of materials grouped together exhibiting an ascending or descending gradation of emissitivities, with or without numbers associated with the various emissitivities. Other shapes and patterns not shown may be used singularly or in groups of the same or various patterns.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A system for calibrating a first thermal camera comprising:
    a calibration target; and
    the first thermal camera, to be calibrated, positioned to capture a first infrared image of calibration target; and
    a second thermal camera positioned to capture a second infrared image of the calibration target;
    wherein:
    the calibration target comprises:
        a checkerboard pattern of a plurality of symbols each comprising corner points, wherein at least some of the symbols have a first value of emissitivity and at least some of the symbols have a second value of emissitivity wherein the first value of emissitivity is at least 20% different from the second value of emissitivity; and
        a plurality of active infrared light sources, wherein an active infrared light source is positioned at each corner point;
    the at first and second values of emissitivities have a contrast perceptible in the first infrared image captured by the first thermal camera;
    wherein the first infrared image captured by the first thermal camera is compared with the second infrared image captured by the second thermal camera; and
    using the first and second infrared images for calibrating one of the first or second thermal cameras with the other of the first or second thermal cameras.

2. The system of claim 1, wherein:
    every other symbol of the pattern has a first value of emissitivity; and
    the remaining symbols of the pattern have a second value of emissitivity.

3. The system of claim 1, further comprising:
    an electro-optic camera for capturing a non-infrared image of the calibration target; and
    comparing the first infrared image captured by the first thermal camera with the non-infrared image captured by the electro-optic camera; and
    using the first infrared image and the non-infrared image for geometrical calibration of the first thermal camera relative to the electro-optical camera.

4. The system of claim 1, further comprising:
    a processor connected to the first thermal camera; and
    wherein:
    the first thermal camera is a digital camera;
    the processor compares the first infrared image with a standard reference infrared image of the calibration target in a memory of the processor;
    if there are one or more differences between the first infrared image and the standard reference infrared image, the processor calibrates the first thermal camera to reduce the one or more differences between the first infrared image and the standard reference infrared image.

5. A method for calibrating a first thermal camera, comprising:
    providing a surface of a first material;
    placing a diagram of a pattern, having two or more delineated areas, on the surface of the first material;
    coating at least one but not all of the delineated areas with a second material having a emissitivity different than a emissitivity of the surface of the first material;
    providing a plurality of active infrared light sources on the surface of the first or second material at a plurality of corners of the first or second material; and
    using the first thermal camera to capture a first infrared image of the surface of the first material having the second material; and
    wherein the first infrared image shows the pattern of the delineated areas with the second material as being distinguishable from the surface of the first material;
    the surface of the first material having the second material has a checkerboard pattern of geometric symbols having alternating first and second materials;
    the checkerboard pattern is a calibration target; and
    a camera calibration toolbox is used to calibrate the first thermal camera relative to intrinsic and extrinsic parameters.

6. The method of claim 5, further comprising determining calibration characteristics of the first thermal camera from the checkerboard pattern in the first infrared image of the surface of the first material having the second material.

7. The method of claim 5, further comprising:
    using a second thermal camera to capture a second image of the surface of the first material having the second material;
    comparing the first and second images; and
    calibrating one camera relative to the other camera of the first and second thermal cameras based on the comparing the first and second images.

8. The method of claim 5, wherein:
    the emissitivity of the first material is at least X percent different than the emissitivity of the second material; and
    X is 20 percent.

9. The method of claim 5, wherein the checkerboard pattern comprises geometric symbols exhibiting at least two different emissitivities.

10. The method of claim 5, further comprising:
using an electro-optical camera for capturing a non-infrared image of the surface of the first material having the second material; and
comparing the first infrared image and the non-infrared image; and
using the first infrared image and the non-infrared image for geometrical calibration of the first thermal camera relative to the electro-optical camera.

11. The method of claim 5, further comprising comparing the first infrared image with a reference infrared image of the surface of the first material having the second material for calibration of the first thermal camera.

12. An approach for thermal camera calibration, comprising:
providing an infrared calibration target including one or more infrared light emitting diodes;
positioning a thermal camera for capturing an infrared image of the calibration target;
calibrating the thermal camera with the infrared image of the calibration target; and
wherein the calibration target comprises a pattern of shapes having an ascending gradation of a plurality of different emissitivities, wherein a shape of the pattern of shapes has an emissitivity at least 20% different from an adjacent shape.

13. The approach of claim 12, further comprising:
obtaining intrinsic and/or extrinsic parameters of the thermal camera from the calibrating the thermal camera; and
transforming pixel coordinates of the thermal camera to world coordinates based on the intrinsic and/or extrinsic parameters of the thermal camera.

14. The approach of claim 12, wherein:
the light emitting diodes are situated at corner points of the shapes.

* * * * *